United States Patent [19]

Rolfs

[11] Patent Number: 4,541,807
[45] Date of Patent: Sep. 17, 1985

[54] DEVICE FOR DEMONSTRATING OCCLUSION AND THE EFFECTS THEREOF ON THE TEMPOROMANDIBULAR JOINT

[75] Inventor: Donald Rolfs, Wenatchee, Wash.

[73] Assignee: Denar Corporation, Anaheim, Calif.

[21] Appl. No.: 543,290

[22] Filed: Oct. 19, 1983

[51] Int. Cl.$^4$ ............................................. G09B 23/32
[52] U.S. Cl. ................................................ 434/264
[58] Field of Search ............... 434/185, 263, 264, 256

[56] References Cited

U.S. PATENT DOCUMENTS

| | | | |
|---|---|---|---|
| 728,818 | 5/1903 | Wright | 434/264 |
| 3,376,645 | 4/1968 | Huff | 434/264 |
| 3,616,537 | 11/1971 | Schuchard | 434/264 |
| 3,646,680 | 3/1972 | Wollney | 434/263 |
| 3,740,854 | 6/1973 | Black | 434/263 |

*Primary Examiner*—Harland S. Skogquist
*Attorney, Agent, or Firm*—Edward D. O'Brian; K. H. Boswell

[57] ABSTRACT

A device useful in demonstrating occlusion and the effect thereof on the temporomandibular joint can be constructed so as to use an upper member shaped so that portions of it simulate a maxilla, maxillary teeth and a fossa and so as to use a lower member shaped so that portions of it simulate a mandible, mandibular teeth and a condyle. The lower member is held with respect to the upper member through the use of a plurality of resilient members in such a manner that the condyle is within the fossa and is movable with respect to it and in such a manner that the two sets of simulated teeth are adjacent to one another. The condyle is smaller than the fossa so at to permit it to be moved generally within the fossa as the lower member is moved relative to the upper member in demonstrating occlusion between various different types of teeth.

3 Claims, 9 Drawing Figures

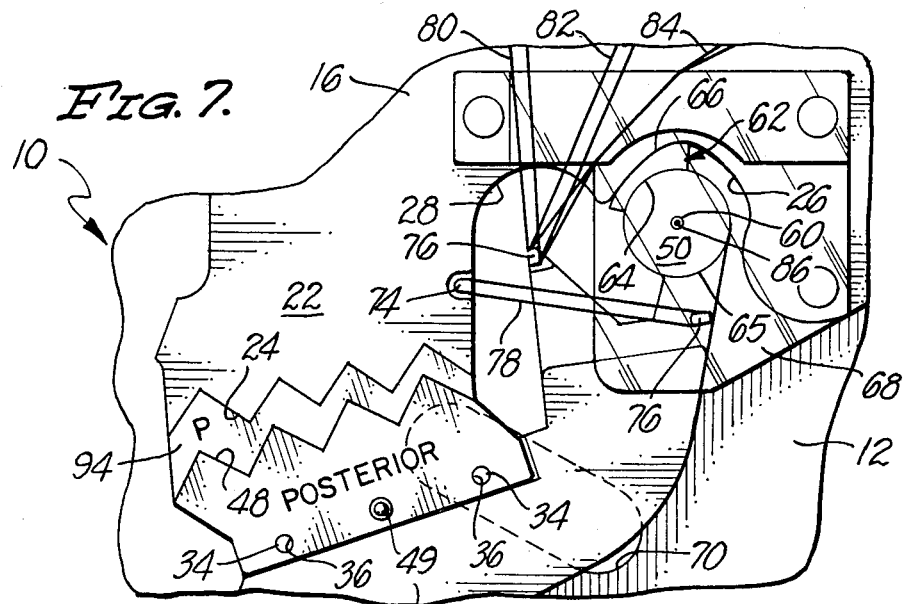
FIG. 7.
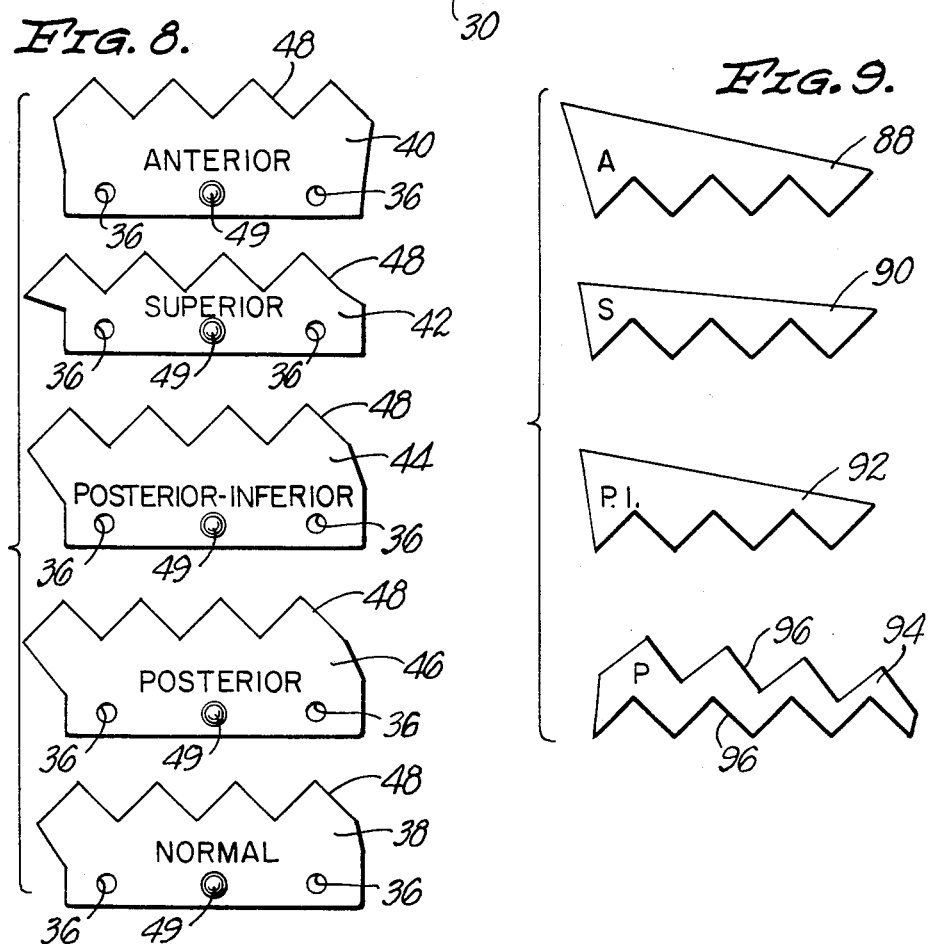
FIG. 8.
FIG. 9.

DEVICE FOR DEMONSTRATING OCCLUSION AND THE EFFECTS THEREOF ON THE TEMPOROMANDIBULAR JOINT

BACKGROUND OF THE INVENTION

This invention pertains to a new and improved device for demonstrating occlusion and the effect thereof on a temporomandibular joint.

Devices of this category are especially useful in demonstrating to those unfamiliar with the field of occulsion and with the operation of a temporomandibular joint the interrelationship between the two. This is especially desirable in explaining the cause or possible cause of many different painful ailments which can result from occlusal problems tending to cause temporomandibular joint dysfunctions. Because of the nature of this invention, it is considered necessary to explain certain terms as are commonly utilized in the dental field as a prelude to explaining the invention itself.

The term "occlusion" as used herein designates the manner in which the teeth fit together within a mouth, as for example, when the jaws of an individual are in a "normal position" in which the teeth on the upper and lower jaws rest against one another. Technically, the upper jaw of an individual is referred to as a maxilla and the teeth located on it are referred to as maxillary teeth. In a corresponding manner, the lower movable jaw is referred to as a mandible and the teeth on it are referred to as mandibulary teeth. The motion of the mandible relative to the maxilla is controlled in part by two joints which are roughly comparable to a common ball and socket joint. Such joints are referred to as temporomandibular joints. Each of such joints includes a socket-like element referred to as a fossa in association with the maxilla and a ball-like element referred to as a condyle associated with the mandible. The condyle fits generally within the fossa in such a manner as to permit several different types of movement of the mandible. One type of such movement is of a rotary character; it involves rotation of the mandible about an axis which is commonly referred to as a hinge axis. The position of this hinge axis can be varied by varying the position of the lower jaw or mandible as, for example, by extending the mandible in a protrusive manner. Normally, the hinge axis is in a so-called centric position corresponding to a position of the mandible in which the teeth on both of the jaws having normal occlusion fit closely so as to be aligned with one another.

When the maxillary and the mandibular teeth are not in a desired or proper relationship to one another as, for example, as a result of malocclusion, normally a person will automatically shift the position of the mandible so as to compensate for the malocclusion of the teeth. In the usual instance, this results in the condyles of a jaw being shifted out of a centric position so that the hinge axis is slightly displaced from its normal location. This temporomandibular joint dysfunction results in a number of different consequences largely relating to the stress or strain associated with various muscles used to support and move the mandible. These may result in ear, head, neck, back, facial and other pains resulting from what may be loosely referred to as jaw or temporomandibular joint "disharmony".

The devices of the present invention are useful in indicating or illustrating how the position of the condyle and of the hinge axis within a temporomandibular joint will vary in accordance with the occlusion within a mouth. This is considered desirable in indicating to a person, such as a patient, suffering from a consequence of malocclusion the probable cause of his or her problem and the need for corrective measures. The devices of the present invention are especially significant in their ability to demonstrate or illustrate how the position of the condyle and a hinge axis may be affected as a result of various different types of occlusal problems. Further, these devices are important as being capable of being used to illustrate in a generalized manner the ways in which splint or jaw repositioning devices may be utilized in the diagnosis and treatment of various types of occlusal problems.

Those in the field of dentistry will, of course, recognize that there have been many different types of devices which are capable of being used to demonstrate both proper and abnormal or undesirable occlusion between maxillary and mandibular teeth and which are capable of being utilized to demonstrate the treatment or correction of undesirable occlusion by various different techniques. In one of these techniques—occlusal equilibration—the mating surfaces of various teeth are reshaped so as to eliminate pressure on certain teeth when the jaws are closed or during common jaw movement such as chewing. Various occlusal problems are, on occasion, resolved through restorative techniques involving the replacement or reconstruction of the individual teeth. Occlusal problems may also be combatted with use of splint or jaw repositioner appliances tending to encourage an individual to hold the mandible so that the condyles carried by it are in a separate position.

Perhaps the most common devices capable of being used to demonstrate both proper and abnormal occlusion and these various different treatment techniques or modalities are dental articulators. In general, common articulators are considered to be too complex and too "technical" to be used in explaining various elementary factors relating to occlusion to those who are untrained in the field of dentistry. Further, in general, common articulators are considered to be undesirably expensive for these purposes, At various times somewhat simplified structures capable of demonstrating normal and abnormal occlusion have been developed primarily as an adjunct to the use of articulators which are somewhat simpler and less expensive than conventional articulators.

One such device of this type is known as a "Gnathokin". It consists of a lower part corresponding to a mandible upon which there is pivotally mounted an upper part corresponding to a maxilla. Both of these parts carry what may be loosely referred to as a "framework;" the positions of these frameworks are capable of being adjusted relative to the parts upon which they were located. Each of them carries various simulated teeth. At least one other device of a substantially similar related character has been developed. It is considered that devices of these categories are undesirable in demonstrating normal occlusion and various types of abnormal or undesirable occlusion because of their relative complexity. This is related to the consideration that a device useful in demonstrating occlusion and problems pertaining to or resulting from malocclusion to those who are untrained in the field of dentistry should be comparatively simple to avoid confusion and also to minimize the cost of the device.

BRIEF SUMMARY OF THE INVENTION

It is believed that it will be apparent from the preceding discussion that there is a need for new and improved devices for demonstrating occlusion and occlusion problems. Broadly, the present invention is intended to fulfill this need. It is also intended to provide devices for demonstrating occlusion which may be easily and conveniently constructed at a comparatively nominal cost, which may be easily and conveniently utilized in demonstrating both normal and abnormal occlusion and various treatment modalities; in particular the use of splint/jaw repositioners; and which are capable of prolonged usage with little or no maintenance.

In accordance with this invention, these various objectives are achieved by providing a device for demonstrating occlusion which includes an upper member, portions of which simulate the maxilla with maxillary teeth located thereon and a fossa, a lower member, portions of which simulate a mandible with mandibular teeth located thereon and a condyle in a positon relative to said fossa said condyle being movable with respect to said fossa so as to permit said lower member to be moved relative to said upper member in a manner simulating normal jaw movement, such movement including rotating movement of said condyle about a hinge axis, said device including the improvement which comprises: said condyle being smaller than said fossa so as to be capable of being moved into and out of a centric position of said hinge axis of said condyle with respect to said condyle, a plurality of resilient members extending between said upper and lower members, said resilient members being connected to said upper and lower members so as to simulate muscles which normally support a mandible, said resilient members tending to bias said condyle generally towards said fossa into a position within said fossa which depends upon the occlusion between said maxillary and said mandibular teeth.

BRIEF DESCRIPTION OF THE DRAWINGS

Because of the nature of this invention, it is best more fully explained with reference to the accompanying drawings in which:

FIG. 7 is a view corresponding to FIG. 6 showing the use of a repositioner appliance insert with the insert shown in FIG. 6.

FIG. 8 is a view showing the top plan views of various different inserts capable of being used in the device shown in the preceding figures to demonstrate normal and various different types of malocclusion; and FIG. 9 is a view showing the top plan views of various different respositioner appliance inserts capable of being used with corresponding inserts as are indicated in FIG. 8.

Figure 1:
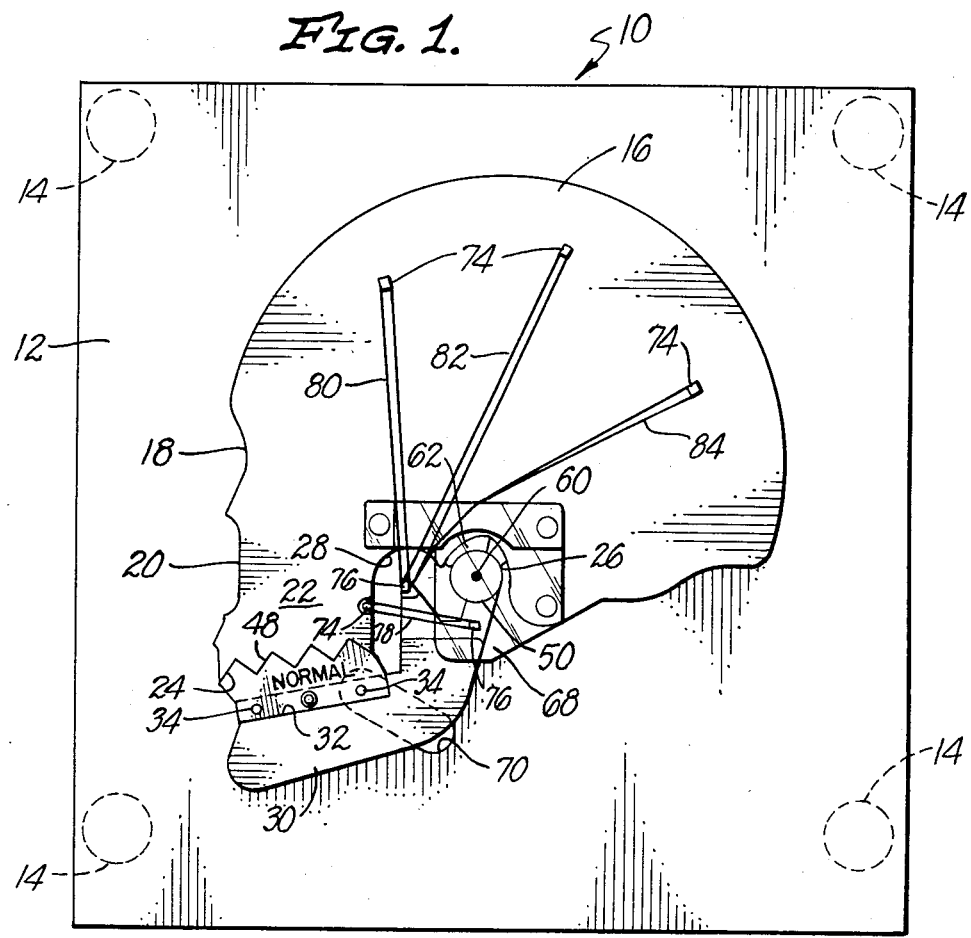
FIG. 1 is a top plan view of a presently preferred embodiment or form of a device for demonstrating occlusion in accordance with the present invention.

The particular device illustrated in the drawings is constructed so as to utilize the operative concepts or principles of the invention set forth and defined in the appended claims. It is considered that those skilled in the design and construction of dental articulators will have little or no difficulty in embodying these concepts or principles in a variety of somewhat differently constructed and somewhat differently appearing devices through the use of routine skill in the field of the design and construction of dental articulators.

DETAILED DESCRIPTION

In the drawings there is shown a device 10 in accordance with the present invention which includes a flat base plate 12 which is adapted to be supported on any appropriate supporting surface (not shown) through the use of small conventional legs or guides 14. This plate 12 is secured to another plate 16 shaped so as to effectively simulate the broad shape of a skull. This plate 16 probably includes an indentation 18 corresponding to an eye socket and another indentation 20 corresponding to a nose opening in a skull so as to facilitate a patient mentally relating the configuration of the plate 16 to an outline of the human skull.

This plate 16 also includes an area 22 which roughly corresponds to the maxilla within the human skull and a lower edge 24 approximately corresponding to an outline of maxillary teeth. This plate 16 is provided with a downwardly directed internal cavity 26 approximately corresponding to a fossa within a human head. It also includes an enlarged cavity 28 located generally between the maxilla area 22 and the fossa like cavity 26. This cavity 28 is provided to accommodate certain parts as subsequently indicated. For convenience of designation in subsequent portions of this specification the area 22 is referred to as a maxilla or a simulated maxilla, the edge 24 is referred to as designating or simulating the maxillary teeth and the cavity 26 is referred to as a fossa or a simplified fossa.

The plate 16 is utilized in conjunction with a movable plate 30 which is essentially shaped so as to simulate or represent a mandible. This plate 30 includes an elongated recess 32 within which there are located several alignment pins 34. These pins 34 are adapted to fit within correspondingly shaped and correspondingly located sets of holes 36 in any of a series of dental and simulating inserts 38, 40, 42, 44 and 46. The insert 38 contains an edge 48 which is adapted to fit against the edge 24 in demonstrating normal occlusion while corresponding edges 48 for use in demonstrating abnormal occlusion of various different types are located on the inserts 40, 42, 44 and 46. The specific types of malocclusion to be demonstrated utilizing these inserts 40, 42, 44 and 46 are as labeled on these inserts in FIG. 8 of the various figures of the drawings. A small handle 49 may be provided on the inserts 38, 40, 42, 44, and 46 so as to facilitate their being handled.

The plate 30 also includes a terminal disk 50 corresponding to a condyle which is smaller than the interior of the fossa 26 which is located within this fossa 26. This disk 50 extends parallel to the base plate 12 and is spaced from it a short distance. The remainder of the plate 30 is positioned directly upon this base plate 12 in such a manner as to be capable of being slid or moved along the surface of it. For convenience of reference in the subsequent portions of this specification, the plate 30 is referred to as a mandible while the inserts 38 are referred to as mandibular teeth and the disk 50 is referred to as a condyle or simulated condyle.

Figure 2:
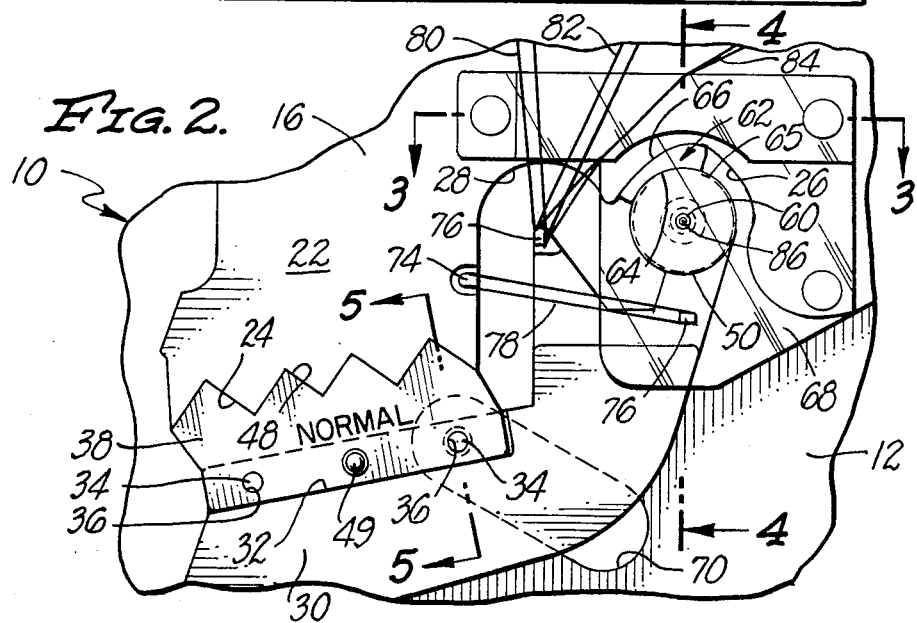
FIG. 2 is an enlarged, fragmentary view corresponding to a part of FIG. 1 drawn at a scale which is larger than the scale used in FIG. 1.
Figure 3:
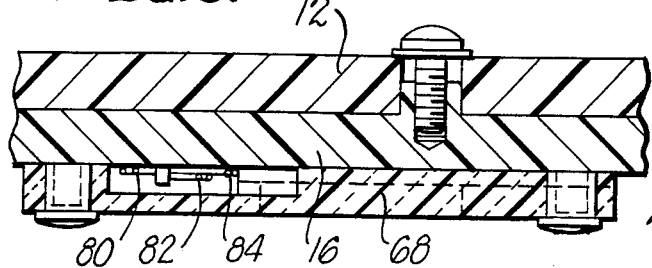
FIG. 3 is a partial cross-sectional view taken at line 3—3 of FIG. 2.
Figure 4:
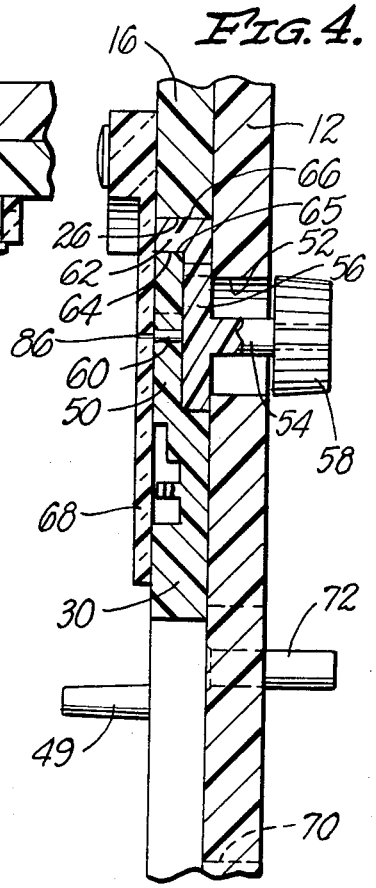
FIG. 4 is a partial cross-sectional view taken at line 4—4 of FIG. 2.
Figure 5:
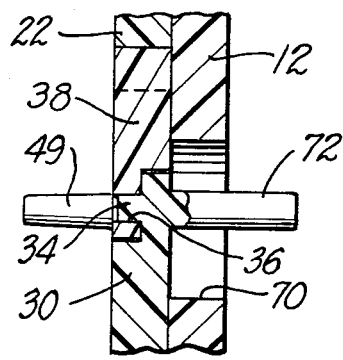
FIG. 5 is a partial cross-sectional view taken at line 5—5- of FIG. 2.

In the device 10 a hole 52 is provided in the base plate 12 generally beneath the condyle 50 for the purpose of accommodating a small shaft 54. This shaft 54 is secured directly to an adjustment plate 56 and to a small knob 58 used in rotating this plate 56. The plate 56 is secured to the condyle 50 through the use of a small shaft 60 in such a manner as to permit relative rotation between the plate 56 and the condyle 50. This shaft 60 is aligned with the axis of the shaft 54 and is used to transfer motion between the plate 56 and the condyle 50. Of course, any movement of the condyle 50 is coordinated with movement of the mandible 30 because the two are connected together. It should be noted that as the mandible 30 is moved as described in the preceding, that the knob 58 will shift somewhat in position relative to the plate 12. In order to accommodate this, it is necessary for the shaft 54 to be smaller than the hole 52. This plate 56 is provided with a peripheral, somewhat elongated cam 62 which when viewed as shown in FIGS. 1 and 2 appears more or less as a curved wedge having a curved inner edge 64 fitting against the exterior 65 of the condyle 50 and a wedgelike outer edge 66 which is capable of being moved so as to fit in various manners against the interior edge 64 of the fossa or cavity 26.

The device 10 also includes a transparent retainer plate 68 secured to the plate 16 so as to overlie the condyle 50 and the fossa 26 in order to retain them in position. It further includes an elongated opening 70 located generally beneath the mandible 30 in the plate 12. This opening 70 is shaped so as to accommodate a small arm 72 in such a manner that the arm 72 may be actuated so as to move the mandible 30 to various different positions roughly corresponding to the positions of a real mandible during movement of such a mandible.

The device 10 further includes four hooks 74 on the plate 16 and two hooks 76 on the mandible 30. A common rubber band 78 corresponding to the lateral pterygoid muscle extends between one of the hooks 74 and one of the hooks 76. A further rubber band 80 corresponding to the anterior portion of the temporalis muscle extends between a hook 74 and another hook 76. A further rubber band 82 corresponding to the medial portion of this same muscle extends between a further hook 74 and this last hook 76. A fourth rubber band 84 corresponding to the posterior portion of the temporalis muscle extends between the last hook 74 and the same hook 76 to which the rubber bands 80 and 82 are attached. These rubber bands 78, 80, 82, and 84 serve as resilient means tending to bias the condyle 50 generally towards the fossa 26 into a position within the fossa 26 which depends upon the occlusion between the simulated teeth 24 and 48 and the position of the cam 62 relative to the fossa 26.

The use of the device 10 is comparatively easy to understand. As it is used to demonstrate normal occlusion the insert 38 intended to represent normal occlusion is located in an operative position as indicated in FIGS. 1 and 2. In this position the various rubber bands 78, 80, 82 and 84 will bias the mandible 30 so that the edges 24 and 48 fit closely against one another as indicated in FIGS. 1 and 2. This type of a "fit" between these edges 24 and 48 is of a normally desired type representing satisfactory or good occlusion.

When these edges 24 and 48 fit in this manner, the rubber bands 78, 80, 82 and 84 hold the condyle or condyle disk 50 in a centric position within the fossa 26. In this position, this condyle 50 is spaced from the interior edge 64 of the fossa or cavity 26 and the cam 62 is interposed between a portion of the condyle 50 and a portion of this interior edge 64. In this centric position the shaft 60 is aligned with a small dot 86 on the retainer plate 68. This dot 86 is intended to represent the location of the hinge axis of the condyle 50 when the mandible 30 is in a closed position and when there is normal occlusion.

Figure 6:
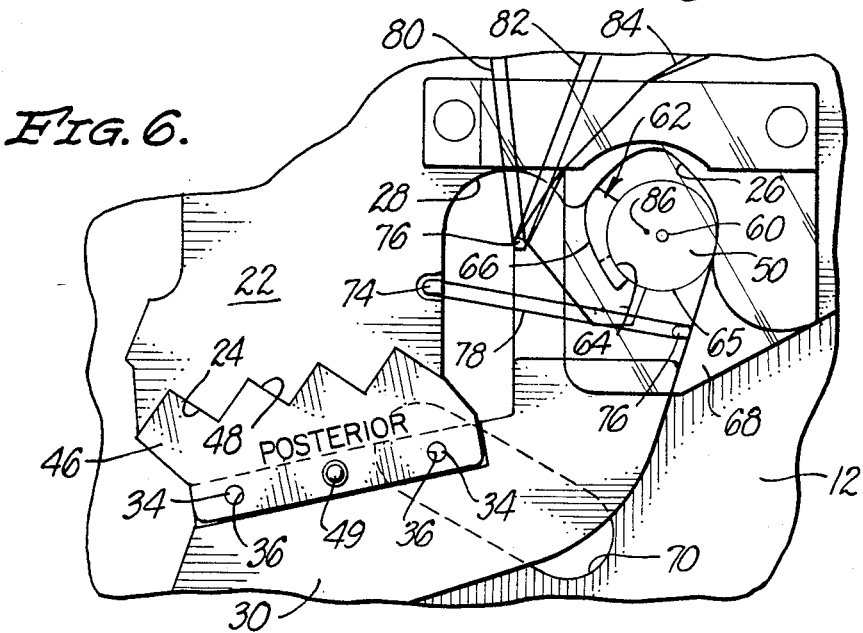
FIG. 6 is a view corresponding to FIG. 2 showing the use of a different insert than illustrated in FIG. 2.

To demonstrate the effects of abnormal occlusion of any particular type of insert 38 is replaced by an appropriate one of the inserts 40, 42, 44 and 46. This is illustrated in FIG. 6 which shows the particular insert 46 corresponding to posterior condular displacement in place in the mandible 30. When the insert 46 is substituted for the insert 38 an edge 48 on it corresponding to mandibular teeth will not fit against the edge 24 so long as the condyle 50 is in a centric position as described in the preceding. As the device 10 is used for educational purposes at this point it will normally be indicated that the body will tend to hold a real mandible in whatever position will result in good occlusion between the teeth on a person's jaws. It will then be apparent that such occlusion can only be obtained by the body moving the condyles of the jaw out of a normal centric position.

With the device 10 this is demonstrated by manipulating the knob 58 so as to turn the cam 62 to the extent necessary to permit the rubber bands 78, 80, 82 and 84 to bias the mandible 30 so that the edges 24 and 48 fit closely against one another. When this occurs, the shaft 60 will be moved away from the dot 86. This indicates condular displacement away from a normal or desired hinge axis. Normally, a patient will have little difficulty in realizing that such displacement of the condyle 50 out of a centric position will result in the body having to accommodate various muscles and tendons being "used" in other than a normal manner. An individual will usually have little difficulty in realizing the potential of the stresses and strains of this leading to various kinds of ailments as discussed earlier in this specification.

The importance of treatment of such ailments can be demonstrated through the use of any of a series of jaw repositioning appliances or spacers 88, 90, 92 and 94. The spacer 88 corresponds to and is adapted to be utilized with the insert 40; the spacer 90 is adapted to be utilized with the insert 42; the spacer 92 is adapted to be utilized with the insert 44; and the spacer 94 is adapted to be utilized with the insert 46. When these various spacers 88, 90, 92 and 94 are used with their corresponding inserts 40, 42, 44 and 46 the same type of results are achieved. The nature of such results are effectively indicated with the use of the spacer 94 with the insert 46 as illustrated in FIG. 7 of the drawings. When this spacer 94 is used between the edges 24 and 48, the edges 96 on it fit against the edges 24 and 48 so as to hold the mandible 30 in a position such that the rubber bands 78, 80, 82 and 84 bias the mandible 30 so that it is stable with the condyle 50 in a centric position as previously described. It will normally be readily apparent from this that the stresses and strains on the muscles and tendons of a person will be decreased by using a splint or jaw repositioning appliance so as to achieve a centric location of the hinge axis of the mandible 30 as illustrated in FIG. 7. The same benefit can also be illustrated through the use of other of the spacers 88, 90 and 92 to corresponding inserts 40, 42 and 44.

I claim:

1. A device for demonstrating occlusion which includes an upper member, portions of which simulate the maxilla and maxillary teeth located thereon and a fossa, a lower member, portions of which simulate a mandible, mandibular teeth located thereon and a condyle in a position relative to said fossa, said condyle being movable with respect to said fossa so as to permit said lower member to be moved relative to said upper member in a manner simulating normal jaw movement, such movement including rotating movement of said condyle about a hinge axis, said device including the improvement which comprises:

said condyle being smaller than said fossa so as to be capable of being moved into and out of a centric position of said hinge axis of said condyle with respect to said fossa, a plurality of resilient members extending between said upper and lower members, said resilient members being connected to said upper and lower members so as to simulate muscles which normally support a mandible, said resilient members tending to bias said condyle generally towards said fossa into a position within said fossa which depends upon the occlusion between said maxillary and said mandibular teeth, cam means associated with said condyle for controlling the position of said condyle within said fossa, said cam means being capable of being actuated so as to vary the position condyle which said condyle assumes as the result of being biased by said resilient members, said cam means comprising a cam element located generally between the interior of said fossa and a part of the exterior of said condyle, said cam element being movable with respect to both said fossa and said condyle.

2. A device as claimed in claim 1 wherein:

said cam element is a generally wedge shaped element, said wedge shaped element being rotatable relative to said condyle around the exterior thereof.

3. A device for demonstrating occlusion which includes an upper member, portions of which simulate the maxilla and maxillary teeth located thereon and a fossa, a lower member, portions of which simulate a mandible, mandibular teeth located thereon and a condyle in a position relative to said fossa, said condyle being movable with respect to said fossa so as to permit said lower member to be moved relative to said upper member in a manner simulating normal jaw movement, such movement including rotating movement of said condyle about a hinge axis, said device including the improvement which comprises:

said condyle being smaller than said fossa so as to be capable of being moved into and out of a centric position of said hinge axis of said condyle with respect to said fossa, a plurality of resilient members extending between said upper and lower members, said resilient members being connected to said upper and lower members so as to simulate muscles which normally support a mandible, said resilient members tending to bias said condyle generally towards said fossa into a position within said fossa which depends upon the occlusion between said maxillary and said mandibular teeth, said upper and lower members include hooks located thereon, said resilient members are rubber bands each of which extends between a hook on said upper member and a hook on said lower member, said hooks and said rubber bands being located so as to be visible so as to permit an explanation of the movement of said mandible to include an explanation of muscles which normally support a mandible, cam means associated with said condyle for controlling the position of said condyle within said fossa, said cam means being capable of being actuated so as to vary the position which said condyle assumes as the result of being biased by said resilient members, said cam means comprising a cam element located generally between the interior of said fossa and a part of the exterior of said condyle, said cam element being movable with respect to both said fossa and said condyle, said cam element is a generally wedge shaped element, said wedge shaped element being rotatable relative to said condyle around the exterior thereof, a transparent member overlying said condyle and said fossa, said condyle is represented as a disk, the periphery of which is opposite the interior of said fossa, said disk including a centrally located element, said transparent member including a margin which, when aligned with said centrally located element, indicates that said condyle is in said centric position, said mandibular teeth are located on an insert, said insert being detachable from said mandible so that different inserts simulating differently shaped mandibular teeth corresponding to different types of occlusion can be located on said mandible.

* * * * *

UNITED STATES PATENT AND TRADEMARK OFFICE
CERTIFICATE OF CORRECTION

PATENT NO. : 4,541,807
DATED : SEPTEMBER 17, 1985
INVENTOR(S) : DONALD ROLFS

It is certified that error appears in the above-identified patent and that said Letters Patent is hereby corrected as shown below:

```
In the Abstract, line 13, "at" should be --as--.
Column 2, line 42, after the word "purposes" the punctua-
                   mark "," should be --.--.
Column 3, line 68, "respositioner" should be --repositioner--.
Column 4, line 62, after the first occurence of the word
                   "fossa 26" add the word --and--.
Column 6, line 12, after the word "type" insert a punctua-
                   tion mark --,--, and change the follow-
                   ing word "of" to the word --the--.
Column 7, line 32, after the word "position" eliminate the
                   word --condyle--.
```

Signed and Sealed this

Eighteenth Day of February 1986

[SEAL]

Attest:

DONALD J. QUIGG

Attesting Officer

Commissioner of Patents and Trademarks